United States Patent [19]

Dominguez et al.

[11] 3,754,889

[45] Aug. 28, 1973

[54] HIGHLY FLUXED IRON OXIDE PELLET

[75] Inventors: Ezekiel Dominguez; Henry W. Hitzrot, Jr., both of Bethlehem; John D. Lynn, Center Valley, all of Pa.

[73] Assignee: Bethlehem Steel Corporation, Bethlehem, Pa.

[22] Filed: Oct. 14, 1970

[21] Appl. No.: 80,728

[52] U.S. Cl................................. 75/3, 75/4, 75/5
[51] Int. Cl......... C21b 1/08, C21b 1/28, C21b 1/10
[58] Field of Search .................... 75/3, 4, 5, 94, 40

[56] References Cited
UNITED STATES PATENTS

| | | | |
|---|---|---|---|
| 3,163,519 | 12/1964 | Hanson | 75/94 |
| 3,169,852 | 2/1965 | Price | 75/94 |
| 1,819,064 | 8/1931 | Baumgartner | 75/94 |
| 3,519,386 | 7/1970 | Fedock | 75/94 |
| 3,326,670 | 6/1967 | Bratton | 75/40 |
| 2,871,115 | 1/1959 | Agarwal | 75/3 |

*Primary Examiner*—L. Dewayne Rutledge
*Assistant Examiner*—Peter D. Rosenberg
*Attorney*—Joseph J. O'Keefe

[57] ABSTRACT

A highly fluxed iron oxide pellet containing about 50 percent to about 95 percent iron oxide, about 20 percent calcium oxide plus magnesium oxide, not more than 10 percent silica, not more than 2 percent alumina, the remainder incidental impurities. The ratio of the calcium oxide plus magnesium oxide to the silica plus alumina in the pellet may be from about 0.5:1 to about 4.5:1. The ratio of calcium oxide to magnesium oxide on a weight basis in the pellet is from about 90 to 10 percent to about 80 to 20 percent, respectively.

The pellet of the invention is produced by forming a mix of about 60 to 95 percent iron ore concentrate, about 40 to about 5 percent flux, a binder and moisture. The mix is balled in an apparatus, for example a balling disc. The green balls are dried at a temperature not higher than 500° F. The dried green balls are fired within a temperature range of 2150° F. to 2350° F. to form pellets. The pellets are cooled to room temperature.

6 Claims, 2 Drawing Figures

PATENTED AUG 28 1973 3,754,889

INVENTORS
*Ezekiel Dominguez
Henry W. Hitzrot Jr.
John D. Lynn*

BY *Joseph J. O'Keefe*
ATTORNEY

HIGHLY FLUXED IRON OXIDE PELLET

BACKGROUND OF THE INVENTION

This invention is directed to a highly fluxed pellet containing iron oxide and a high percentage of fluxes.

The production of fluxed sinter is relatively simple since it requires only the feeding of the necessary iron ore concentrate, fluxes and fuel onto a moving grate and applying a sufficient amount of heat either downwardly or upwardly through the bed of sinter to cause the necessary reactions to occur. The fluxes, gangue in the iron ore and the iron ore react and form low melting complex compounds necessary in sintering.

However, in the production of iron ore pellets, it is desired to prevent the formation of a liquid phase during firing. The formation of a liquid phase causes "weeping," that is, the liquid phase formed in the interior of the pellet exudes from the interior of the pellet to the outer surface thereof. Pellets fired on a grate fuse together into a large bulk of material and lose their individual identity. Pellets fired in a rotary kiln "weep" the liquid phase onto the inner surface of the kiln, necessitating shut-down of the kiln to remove "rings" which "choke" the kiln.

It is the object of this invention to manufacture an iron oxide pellet which contains a portion of the flux material required to form the slag in a blast furnace, which pellet will not "weep."

SUMMARY OF THE INVENTION

Broadly, the invention is directed to an iron oxide pellet containing iron oxide, silica, alumina and flux materials, and having a base to acid ratio of about 0.5:1 to about 4.5:1.

PREFERRED EMBODIMENT OF THE INVENTION

Figure 1:
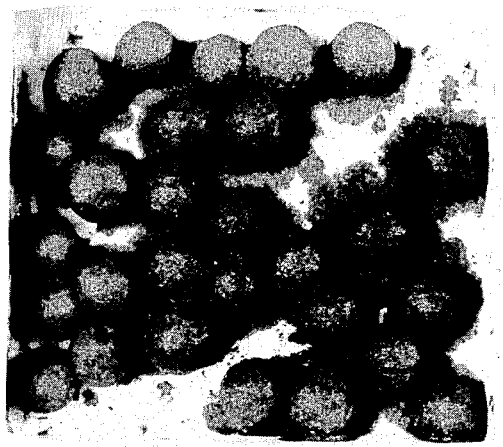
FIG. 1 is a photograph at normal size of prior art pellets which contain 20 percent limestone as a flux.

An iron ore concentrate, for example magnetite concentrate, high in iron oxide and containing acidic impurities is mixed with a flux, for example dolomite and limestone. The mix is balled. The green balls are dried and fired at a temperature for a time to form pellets. The pellets contain iron oxide and sufficient flux to obtain a base to acid ratio of about 0.5 to 1 to about 4.5:1. The pellets can be used as a charge material for metallurgical furnaces, for example, a blast furnace.

More specifically, the iron ore concentrate, for example magnetite concentrate, which contains about 85 percent to about 95 percent iron oxide, not more than 10 percent silica and not more than 2 percent alumina is mixed with a binder, moisture and at least one flux. The mix contains about 60 percent to about 95 percent iron ore concentrate and about 40 percent to about 5 percent flux materials. The fluxes added to the iron ore concentrate are limestone ($CaCO_3$) and dolomite ($CaMg[CO_3]_2$). The fluxes are added to the iron ore concentrate in a ratio of about 40 percent to about 60 percent limestone and about 60 percent to about 40 percent dolomite. The mix is balled in an apparatus, for example a balling cone or disc or drum. The green balls are charged into a furnace, for example a traveling grate furnace. The green balls are dried at a temperature of between about 212° F. to about 500° F. for a time, for example about four minutes, to remove a substantial portion of the moisture in the balls. The dried green balls are then heated to a temperature range of about 2275° F. to about 2400° F. for a time sufficient to harden the dried green balls. The time at this temperature is about 20 minutes. The flux materials are calcined during the firing of the green balls. The carbonate of the fluxes is decomposed, that is, carbon dioxide ($CO_2$) is formed and the limestone and dolomite are converted to calcium oxide (CaO) and magnesia (MgO). A portion of the calcined flux materials combines with the silica and alumina present in the concentrate to form complex calcium aluminum silicates and calcium silicates. The excess lime (CaO), that is, the lime not required to satisfy the silica and alumina, combines with magnesia (MgO) and iron oxide ($Fe_2O_3$) to form refractory calcium magnesium ferrites and calcium magnesium spinels. The pellets are cooled to about 400° F. and are discharged from the furnace. The pellets produced by the above described method contain about 50 percent to about 95 percent iron oxide, about 2 percent to about 30 percent calcium oxide plus magnesium oxide. About 20 percent to about 90 percent of the calcium oxide is produced by the calcination of limestone and the remaining calcium oxide plus the magnesium oxide are produced from the calcination of dolomite. The magnesium oxide constitutes about 3 percent to about 20 percent of the flux materials in the pellets. The pellets have a base (CaO + MgO) to acid ($SiO_2$ + $Al_2O_3$) ratio of about 0.5:1 to about 4.5:1. Of course, a liquid phase can form in the pellets during the firing but the liquid phase is not of sufficient quantity to migrate to the outer surface of the pellet.

A green ball is a spherical-like partical about 3/8 inch to about 1¼ inches in diameter containing iron ore concentrate, fluxes and moisture.

A dried green ball is a green ball which has been heated to within a temperature range of about 212° F. to about 500° F.

A pellet is a dried green ball which has been heated to a temperature for a time sufficient to harden the dried green ball.

Limestone is defined as impure calcium carbonate ($CaCO_3$) and containing impurities in amounts usually associated with commercial grade.

Dolomite is defined as the double carbonate of calcium and magnesium [$CaMg(CO_3)_2$] and containing impurities in amounts usually associated with commercial grades.

It will be understood that wherever percentages are recited in this specification and in the claims, such percentages are on a weight basis unless otherwise defined.

Two samples of magnetite concentrate containing 61.2 percent iron, about 1.93 percent silica, 0.32 percent alumina and the remainder incidental impurities were prepared. A flux was added to each sample as follows:

|  | Conc. | Limestone | Dolomite |
|---|---|---|---|
| Sample Mix 1 | 80% | 20% | — |
| Sample Mix 2 | 80% | 10% | 10% |

The mixes were formed into balls having a diameter of one-half inch on a balling disc. The green balls were dried at 500° F. for about three minutes. The dried green balls were then placed in a furnace and were heated to 2300° F. and held at that temperature for about 20 minutes. The pellets were removed from the furnace and cooled to room temperature. An analysis of the pellets showed the following chemical composition:

|  | Iron (%) | Silica (%) | Alumina (%) | Lime (%) | Magnesia (%) | B/A (%) |
|---|---|---|---|---|---|---|
| Sample 1 | 61.2 | 1.93 | 0.32 | 9.00 | 0.30 | 4.13 |
| Sample 2 | 61.9 | 1.94 | 0.32 | 7.20 | 1.80 | 4.00 |

Figure 2:
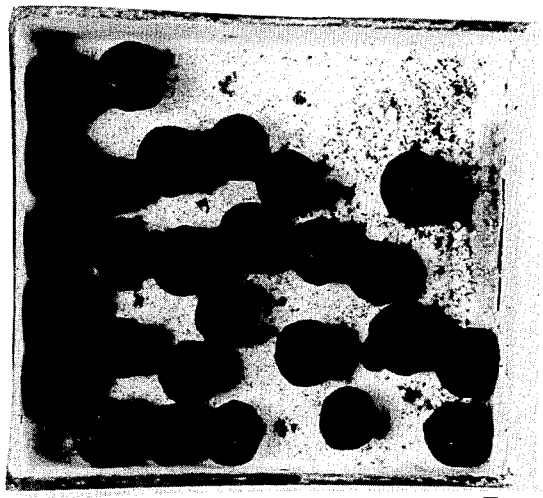
FIG. 2 is a photograph at normal size of pellets of the invention containing about 10 percent dolomite and 10 percent limestone.

Visual inspection of the samples, as shown in the figure, after firing showed that excessive "weeping" occurred in the pellets of sample No. 1 shown in FIG. 1. The pellets were fused together and could not be broken apart. However, no "weeping" occurred in the pellets of sample No. 2 shown in FIG. 2. Each pellet remained a discrete particle during firing and cooling. The pellets had a tumble index of about 90 percent + 3 mesh. A microscopic examination of the pellets showed a microstructure of iron oxide bonded together and calcium magnesium ferrites and calcium magnesium spinels and slag products formed by the reaction between the flux added and the gangue material present, substantially uniformly distributed throughout the cross section of the pellets in sample mix No. 2.

We claim:

1. An iron ore concentrate mix suitable for forming highly fluxed iron oxide pellets, said pellets being characterized by freedom from liquid slag formation upon the outer surface thereof when heated to hardening temperatures, containing about 60 percent to about 95 percent iron ore concentrate by weight, not more than 10% $SiO_2$ by weight, not more than 2% $Al_2O_3$ by weight and about 5 to 40 percent limestone and dolomite by weight, said limestone and dolomite being added in weight ratio of about 40 to 60 percent limestone to about 60 to 40 percent dolomite.

2. The iron ore concentrate mix of claim 1 in which the weight ratio of limestone to dolomite is about 50 percent.

3. The iron ore concentrate mix of claim 1 having a base to acid ratio of about 0.5:1 to about 4.5:1.

4. A highly fluxed iron oxide pellet containing calcium magnesium spinels, calcium magnesium ferrites, slag, and iron oxide, said fluxed pellet being bonded by said spinels and ferrites, said spinels and ferrites being substantially uniformly distributed throughout said pellet, said pellet being characterized by freedom from liquid slag formation upon the outer surface thereof.

5. The iron oxide pellet of claim 4 having a base to acid ratio of about 0.5:1 to about 4.5:1.

6. An iron oxide pellet containing about 50 percent to about 95 percent iron oxide by weight, not more than about 10 percent silica by weight, not more than 2 percent alumina by weight and about 5 percent to about 40 percent flux materials in the form of calcium magnesium spinels and calcium magnesium ferrites, said spinels and ferrites being substantially uniformly distributed throughout said pellet, the amount of flux materials calculated as magnesia being about 3 to 20 percent of the total flux materials and having a base to acid ratio of about 0.5:1 to about 4.5:1, said pellet being characterized by freedom from liquid slag formation upon the outer surface thereof.

* * * * *